United States Patent
Dhanabalan et al.

(10) Patent No.: US 11,245,589 B2
(45) Date of Patent: *Feb. 8, 2022

(54) IOT TOPOLOGY ANALYZER DEFINING AN IOT TOPOLOGY AND ASSOCIATED METHODS

(71) Applicant: CITRIX SYSTEMS, INC., Fort Lauderdale, FL (US)

(72) Inventors: Praveen Raja Dhanabalan, Karnataka (IN); Anup Lal Gupta, Karnataka (IN); Akshata Bhat, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 282 days.

This patent is subject to a terminal disclaimer.

(21) Appl. No.: 16/007,016

(22) Filed: Jun. 13, 2018

(65) Prior Publication Data

US 2019/0386880 A1    Dec. 19, 2019

(51) Int. Cl.
*H04L 12/24* (2006.01)
*H04L 29/12* (2006.01)
*H04L 29/06* (2006.01)

(52) U.S. Cl.
CPC .......... *H04L 41/12* (2013.01); *H04L 61/2503* (2013.01); *H04L 69/22* (2013.01)

(58) Field of Classification Search
CPC ...... H04L 41/12; H04L 69/22; H04L 61/2503
See application file for complete search history.

(56) References Cited

U.S. PATENT DOCUMENTS

| | | | | |
|---|---|---|---|---|
| 5,958,015 | A * | 9/1999 | Dascalu | H04L 29/06 709/224 |
| 9,667,485 | B2 * | 5/2017 | Murphy | H04W 12/06 |
| 10,523,516 | B1 * | 12/2019 | Gupta | H04L 41/12 |
| 2004/0005873 | A1 * | 1/2004 | Groenendaal | H04L 63/102 455/410 |
| 2017/0070417 | A1 * | 3/2017 | Jain | H04L 45/02 |
| 2017/0272317 | A1 * | 9/2017 | Singla | H04L 41/0806 |
| 2017/0317899 | A1 * | 11/2017 | Taylor | H04L 41/0631 |
| 2018/0139104 | A1 * | 5/2018 | Seddigh | H04L 41/0213 |
| 2018/0332069 | A1 * | 11/2018 | Moore | G06F 21/105 |
| 2019/0028545 | A1 * | 1/2019 | Yang | H04L 29/02 |
| 2019/0116027 | A1 * | 4/2019 | Wei | H04W 12/0401 |
| 2019/0349260 | A1 * | 11/2019 | Stamatakis | H04L 67/12 |
| 2019/0386880 | A1 * | 12/2019 | Dhanabalan | H04L 61/2553 |
| 2020/0084277 | A1 * | 3/2020 | Somaraju | H04L 41/0806 |
| 2020/0277847 | A1 * | 9/2020 | Rojas | H04L 63/029 |

OTHER PUBLICATIONS

Kristen Lee "Healthcare IoT security issues: Risks and what to do about them" IoT Agenda.com https://internetofthingsagenda.techtarget.com/feature/Healthcare-IoT-security-issues-Risks-and-what-to-do-about-them?vgnextfmt=print; retrieved from internet Jun. 12, 2018 p. 4.

* cited by examiner

*Primary Examiner* — Hassan Kizou
*Assistant Examiner* — Abdullahi Ahmed
(74) *Attorney, Agent, or Firm* — Allen, Dyer, Doppelt + Gilchrist, PA

(57) ABSTRACT

An Internet of Things (IoT) topology analyzer includes an input to passively receive packets exchanged between IoT devices operating within a network and at least one IoT server connected to the network. A processor is coupled to the input and is configured to determine a number of IoT devices operating within the network based on the received packets, with the number of IoT devices used to define an IoT topology of the network.

25 Claims, 6 Drawing Sheets

IOT TOPOLOGY ANALYZER DEFINING AN IOT TOPOLOGY AND ASSOCIATED METHODS

TECHNICAL FIELD

The present disclosure relates to Internet of Things (IoT) devices, and more particularly, to dynamically defining an IoT topology within a network of IoT devices by passive sensing packets exchanged within the network.

BACKGROUND

When new Internet of Things (IoT) devices are added to an enterprise without the knowledge of an IT administrator, this may pose critical security risks. In the healthcare field, for example, a hospital network of IoT devices offers many benefits, ranging from being able to monitor patients more closely to using generated data for analytics. The problem is that the IT administrator has difficulty determining when new IoT devices have been added to the hospital's network of IoT devices.

For example, a medical device vendor may put a network connection together for 10 new IoT devices, and then the vendor feeds those devices onto the hospital's network without this being know by the IT administrator. This means multiple risks and vulnerabilities are introduced. These vulnerabilities, which largely have not been addressed in the healthcare field, in turn can pose potential harm to patients. This is particularly so when an outside hacker with malicious intent adds an IoT device onto the hospital's network. The hacker's IoT device may then attack other IoT devices in the network and infect them.

The problem of identifying the number of IoT devices within a network becomes more complex if the IoT devices are behind a Network Address Translation (NAT) device. Another problem is when the environment is closed based on the connection between the IoT devices and the server being encrypted. This is more common because each IoT vendor would have their own management tool and may not always expose the API to other tools. For example, security camera IoT devices and refrigerator IoT devices may be managed by different vendors.

SUMMARY

An Internet of Things (IoT) topology analyzer comprises an input configured to passively receive packets exchanged between a plurality of IoT devices operating within a network and at least one IoT server connected to the network, and a processor coupled to the input and configured to determine a number of IoT devices operating within the network based on the received packets. The number of IoT devices may be used to define an IoT topology of the network.

The IoT topology analyzer may advantageously be used to dynamically determine changes in the network in real-time. By defining the IoT topology of the network, this allows an IT administrator to identify potential non-authorized communications when one or more unauthorized IoT devices have been added to the network. The defined IoT topology of the network may also expose vulnerable points, as well as providing visibility and auditing of the IoT topology of the network.

The packets transmitted by the IoT devices may include IP addresses associated with the IoT devices. The processor may be configured to determine the number of IoT devices operating within the network based on the number of IP addresses detected within the received packets, with all packets containing a same IP address belonging to a single IoT device.

The packets transmitted by the IoT devices may be unencrypted, and include client IDs associated with the IoT devices and at least one identifier associated with the at least one IoT server. The processor may be configured to group together the IoT devices based on their respective protocols, with each group belonging to the same protocol. For each group of IoT devices belonging to the same protocol, the processor may divide into sub-groups based the at least one identifier associated with the at least one IoT server, with each sub-group belonging to the same IoT server. The processor may then determine the number of IoT devices operating within each of the sub-groups based on the client IDs, with all packets containing the same client ID belonging to a single IoT device.

The at least one identifier associated with the at least one IoT server may be a server ID and/or a server web address. The network may further include a network address translator (NAT) to exchange the packets between the IoT devices and the at least one IoT server, and wherein the packets received by the input pass through the NAT.

The packets transmitted by the IoT devices may be encrypted, and include at least one IoT server name indication (SNI) associated with the at least one IoT server. The processor may be configured to identify the at least on IoT server based on the at least one SNL.

The packets transmitted by the plurality of IoT devices may include client certificates, with each client certificate including a common name for a corresponding IoT device. The processor may be configured to determine the number of IoT devices operating within the network based on the common names, with all packets containing the same common name belonging to a single IoT device.

Alternatively, the packets transmitted by the IoT devices may not include client certificates, and for each connection between an IoT device and the at least one IoT server the exchanged packets include a session ID for a corresponding IoT device. The processor may be configured to determine the number of IoT devices operating within the network based on the session IDs, with all connections containing the same session ID belonging to a single IoT device.

The processor may be further configured to perform the following when a new session ID for an IoT device is detected: increase the determined number of IoT devices operating within the network by one; detect a packet response from the at least one IoT server to an IoT device having an old session ID not in use; and identify a source port in the packet response so as to monitor a response from the IoT device receiving the packet response. The packet response may include at least one of a keep-alive packet and a ping request based on a protocol associated with the IoT device having the session ID no longer in use.

Based on the monitoring, if the IoT device having the old session ID responds to the packet response, then keep the number of IoT devices increased by one since the IoT device responding to the packet request is an existing IoT device within the network and the IoT device having the new session ID is a new IoT device within the network. If the IoT device having the old session ID does not respond to the packet response, then reduce the number of IoT devices by one since the IoT device having the old session ID has been dropped from the network.

The processor may be further configured to perform the following when a new session ID for an IoT device is detected: increase the determined number of IoT devices operating within the network by one; determine connection characteristics of exchanged packets for the IoT device having the new session ID; determine connection characteristics of stored exchanged packets for an IoT device having an old session ID not in use; and compare the connection characteristics between the IoT device having the new session ID to the IoT device having the old session ID to determine if the IoT device having the old session ID is the same as the IoT device having the new session ID. The connection characteristics may be based on time-out, average data rate, and latency.

Another aspect is directed to a method for operating an IoT topology analyzer comprising an input and a processor coupled to the input. The method comprises passively receiving packets at the input, with the packets being exchanged between IoT devices operating within a network and at least one IoT server connected to the network. The processor may be operated to determine a number of IoT devices operating within the network based on the received packets, with the number of IoT devices used to define an IoT topology of the network.

Yet another aspect is directed to a non-transitory computer readable medium for operating an IoT topology analyzer comprising an input and a processor coupled to the input, and with the non-transitory computer readable medium having a computer executable instructions for causing the IoT topology analyzer to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
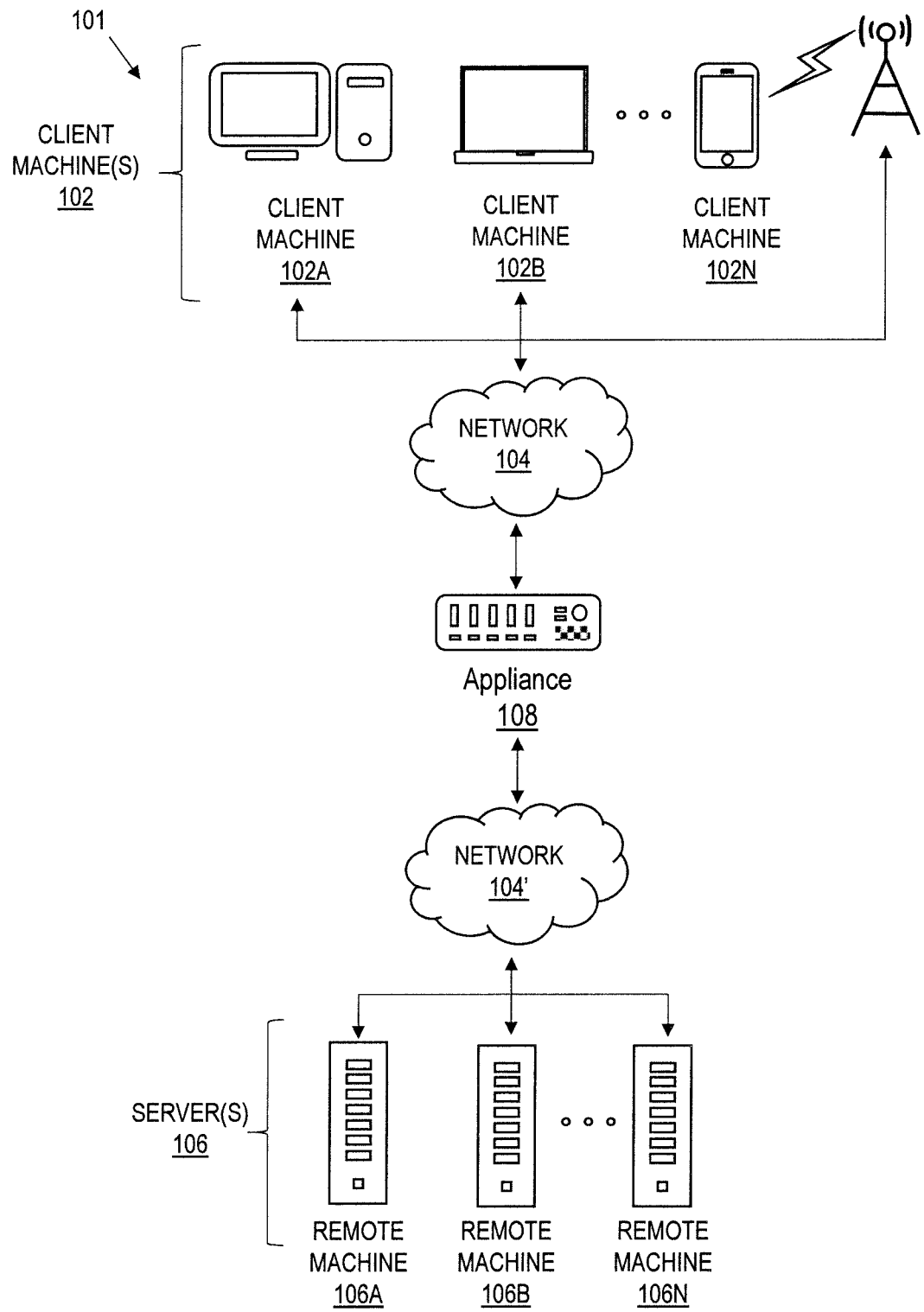
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over Internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
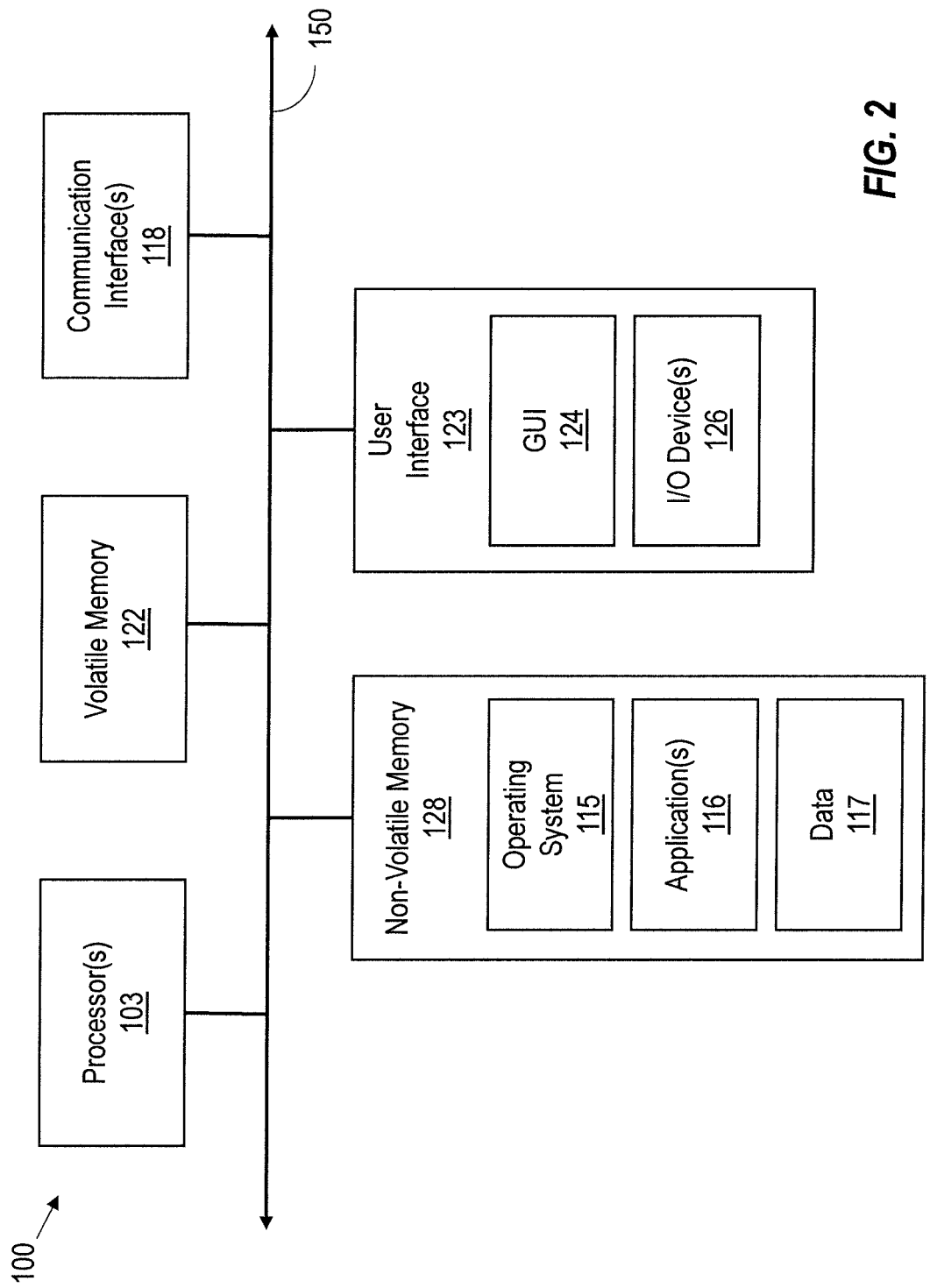
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
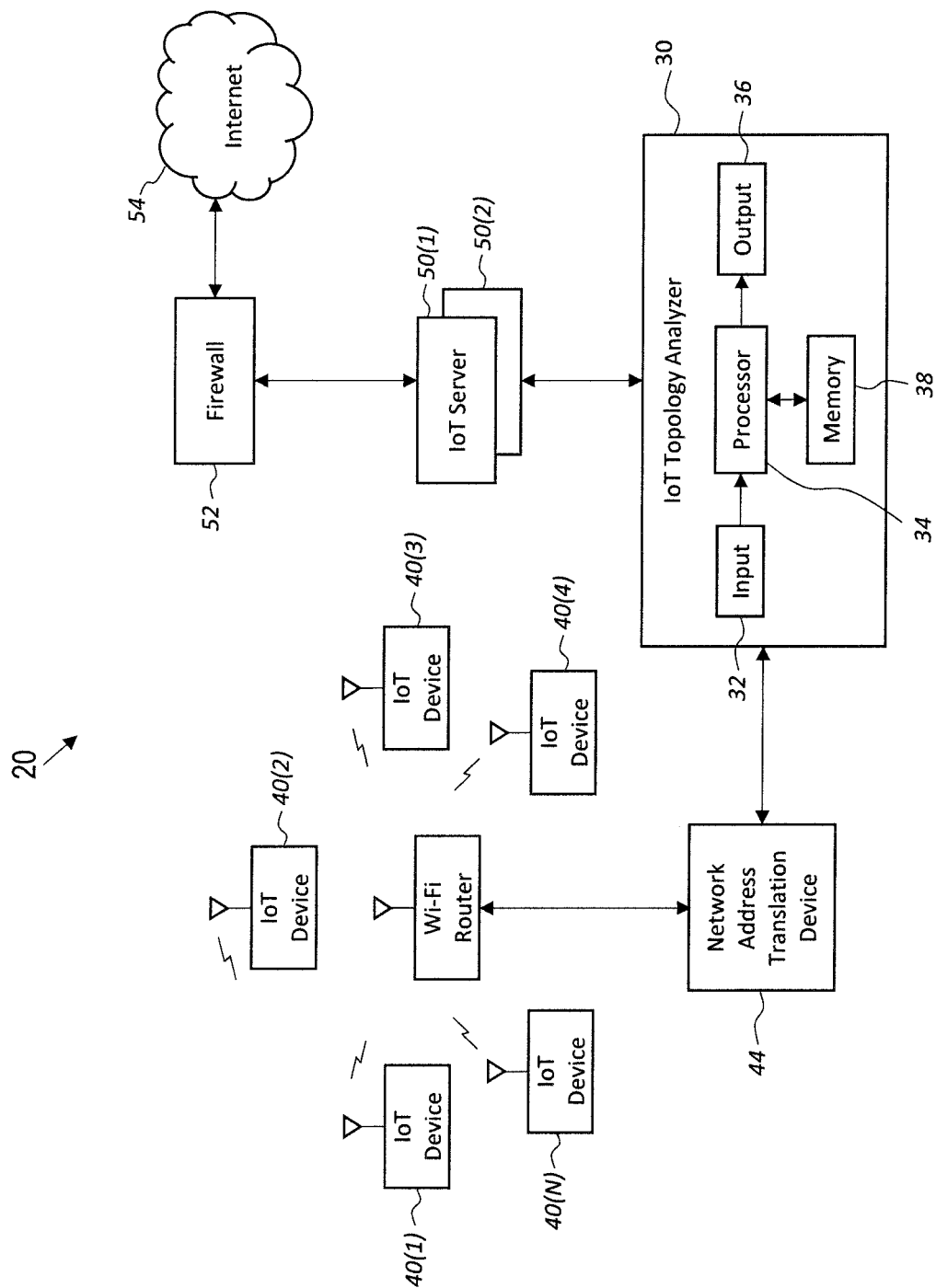
FIG. 3 is a block diagram of an IoT topology analyzer within a network of IoT devices in which various aspects of the disclosure may be implemented.

Referring initially to FIG. 3, an Internet of Things (IoT) topology analyzer 30 within a network 20 of IoT devices 40(1)-40(n) will be discussed. The IoT topology analyzer 30 includes an input 32 to passively receive packets exchanged between the IoT devices 40(1)-40(n) operating within the network 20 and at least one IoT server 50(1)-50(2) connected to the network 20. A processor 34 is coupled to the input 32 and is configured to determine a number of IoT devices operating within the network 20 based on the received packets. The number of IoT devices may then be used by the processor to define an IoT topology of the network 20.

The IoT topology analyzer 30 may be used to dynamically determine changes in the network 20 in real-time, with the determined changes including the addition or removal of IoT devices 40(1)-40(n) operating within the network 20. The IoT topology analyzer 30 includes an output 36 coupled to the processor 34. The output 36 may be configured as a user interface allowing an IT administrator to access the defined IoT topology of the network 20. Alternatively, the output 36 may be configured as a display for displaying the defined IoT topology of the network 20.

By defining the DDT topology of the network 20, this allows the IT administrator to identify potential non-authorized communications when one or more unauthorized IoT devices 40(1)-40(n) have been added to the network 20. When the illustrated network 20 is part of a hospital's network of IoT devices, for example, non-authorized communications may introduce multiple risks and vulnerabilities. These vulnerabilities in turn can pose potential harm to patients. This is particularly so when an outside hacker with malicious intent adds an IoT device onto the hospital's network. The hacker's IoT device may then attack other IoT devices in the network and infect them. The defined IoT topology of the network 20 may also expose vulnerable points, as well as providing visibility and auditing of the IoT topology of the network 20.

In the illustrated network 20, the IoT devices 40(1)-40(n) wirelessly exchange packets with a Wi-Fi router 42, with the router 42 then exchanging the packets with at least one IoT server 50(1)-50(2). The at least one IoT server 50(1)-50(2) may be connected to a firewall 52, which connected to the Internet 54.

The IoT devices 40(1)-40(n) may be generally referred to as an IoT device 40, and the at least one IoT server 50(1)-50(2) may be generally referred to as an IoT server 50. The IoT server 50 may also be referred to as an IoT broker or a gateway. Optionally, the network 20 may include a network address translation (NAT) device 42. The NAT device 42 may be a standalone device as illustrated, or may be included within the router 42 or the IoT server 50, for example.

The illustrated network 20 may be based on wired or wireless connections, or a combination of wired and wireless connections. When the connections are wireless, the input 32 for the IoT topology analyzer 30 is a receiver with an antenna coupled to the receiver. When the connections are wired, the input 32 is configured to interface with the wired connections so as to passively receive the packets being exchanged within the network 20.

The IoT topology analyzer 30 may be a standalone device as illustrated. Alternatively, the IoT topology analyzer 30 may be integrated within one of the components of the network 20, such as the router 42, the NAT device 44, or the IoT server 50, for example.

Figure 4:
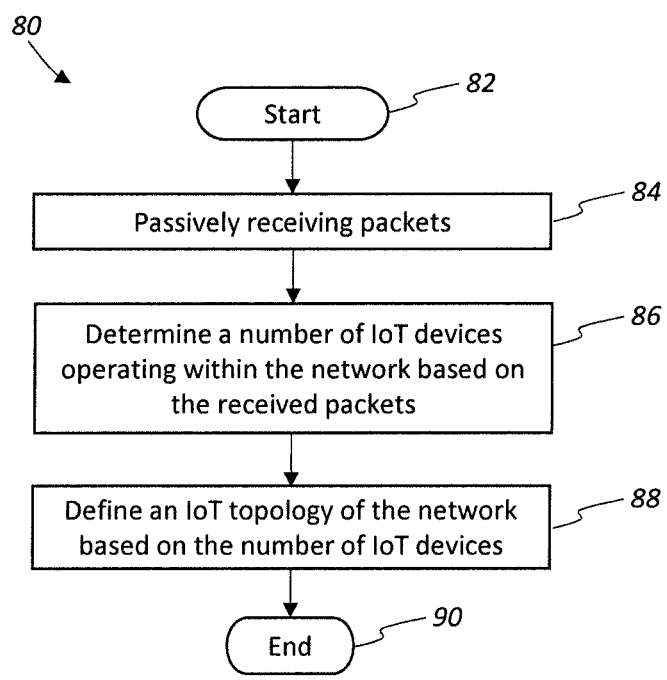
FIG. 4 is a general flowchart illustrating a method for operating the IoT topology analyzer illustrated in FIG. 3.

Referring now to the flowchart 80 illustrated in FIG. 4, and generally speaking, operating the IoT topology analyzer 30 includes from the start (Block 82), passively receiving packets at the input 32 at Block 84, with the packets being exchanged between IoT devices 40 operating within a network 20 and at least one IoT server 50 connected to the network 20. The processor 34 is operated at Block 86 to determine a number of IoT devices 40 operating within the network 20 based on the received packets. The determined number of IoT devices 40 is used at Block 88 to define an IoT topology of the network 20. The method ends at Block 90.

Figure 5:
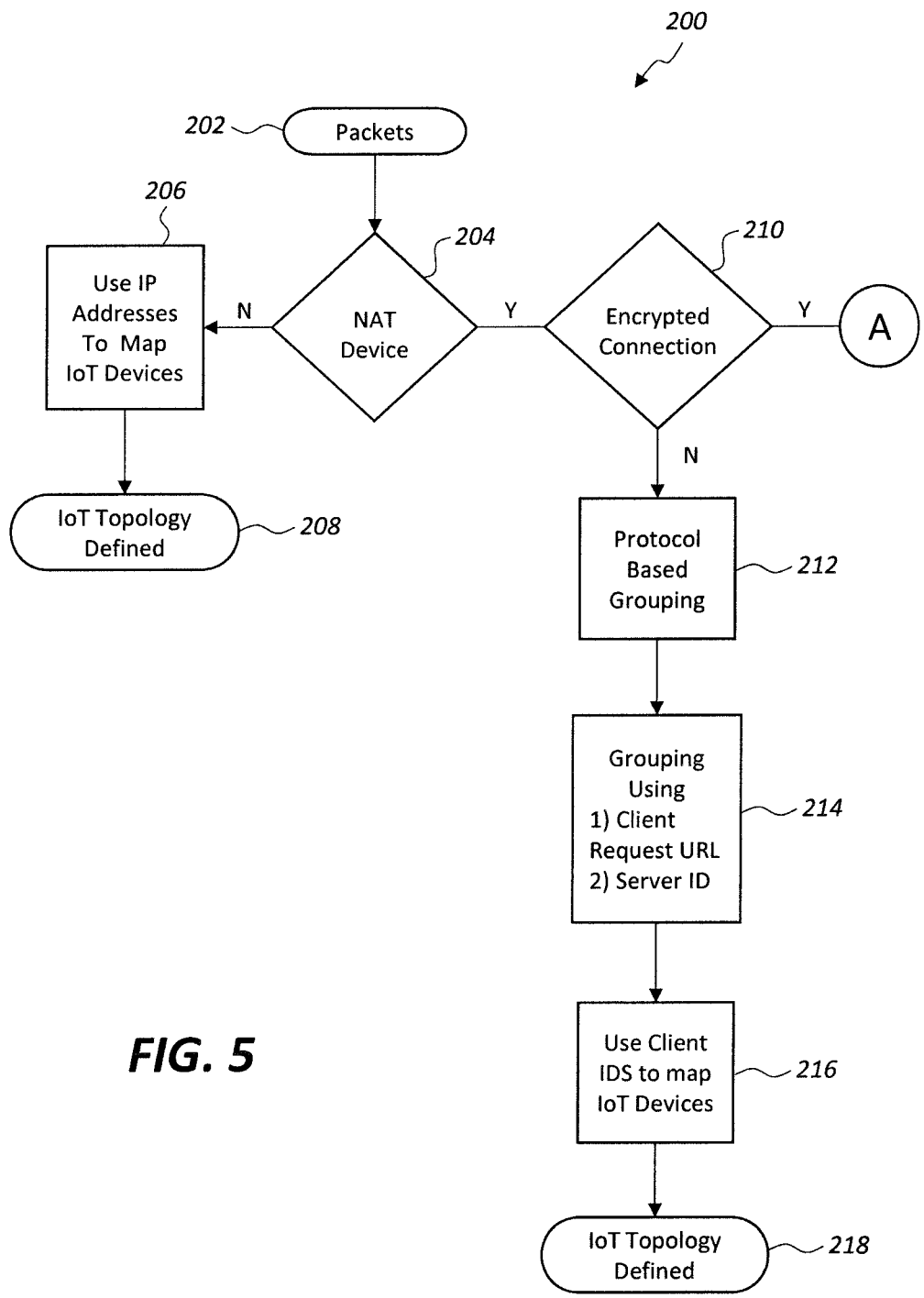
FIGS. 5 and 6 is a more detailed flowchart illustrating a method for operating the IoT topology analyzer illustrated in FIG. 3.

Operation of the IoT topology analyzer 30 will now be discussed in greater detail in reference to the flowchart 100 illustrated in FIGS. 5 and 6. From the start in FIG. 5, Block 102 represents the packets being received by the input 32 of the IoT topology analyzer 30. The packets may also be referred to as traffic data.

As readily appreciated by those skilled in the art, the packets include information such as client IP address, client port, server IP address, server port, the protocol being used, data exchanged when the connection is unencrypted, and a SSL handshake when the connection is encrypted. This information may then be used by the processor 34 to determine the number of IoT devices 40 operating within the network 20 so as to define the IoT topology of the network 20.

The flowchart 100 includes multiple decision points for the processor 34 to determine specifics of the network 20. Based on these specifics, the processor 34 is able to determine the number of IoT devices 40 operating within the network 20.

Starting with decision Block 104, the processor 34 is configured to determine if the network 20 includes a NAT device 44 based on the received packets. If the network does not include a NAT device 44, then the processor 34 determines the number of IoT devices 40 operating within the network 20 based on the number of IP addresses detected within the received packets at Block 106. Each IoT device 40 has an IP address, which may also be referred to as a client ID.

All packets containing a same IP address belong to a single IoT device 40. Even though each IoT device 40 may have multiple connections, the processor 34 characterizes multiple connections with the same IP address as a single IoT device 40. For a network 20 without a NAT device 44, once the number of IoT devices 40 operating within the network 20 has been determined, the IoT topology is defined at Block 108.

If the processor 34 determines at Block 104 that the network 20 includes a NAT device 44, then the original IP addresses are not available since they have been remapped by the NAT device 44. The NAT device 44 remaps each IP address into another by modifying network address information in the IP header of the packets while they are in transit to the IoT server 50.

The next step after determining that a NAT device 44 is present is for the processor 34 to determine if the packets are encrypted at Block 110. If the packets are not encrypted, then the packets will include client IDs associated with the IoT devices 40. Also, the packets will include at least one identifier associated with the at least one IoT server 50. The client ID my vary slightly for each connection. For example, connection 1 could have a device id 'thermometer_1_12312', and connection 2 could have a device id 'thermometer_1_12341'. In this case, the client IDs will be grouped with the unique pattern 'thermometer_1'. All the connections with a client ID containing this pattern will belong to one IoT device 40.

The identifiers associated with the IoT server 50 are based on the protocols used by the IoT devices 40 within the network 20. When the protocol is MQTT, for example, then the identifier is a server ID. When the protocol is HTTP, for example, then the identifier is a server web address, such as a URL.

At Block 112, the processor 34 is configured to group together the plurality of IoT devices 40 based on their respective protocols, with each group belonging to the same protocol. As an example, IoT devices 40(1)-40(3) operate using the MQTT protocol, whereas IoT devices 40(4)-40(n) operate using the HTTP protocol.

For each group of IoT devices 40 belonging to the same protocol, the processor 34 is further configured to divide each group into sub-groups at Block 114 based the at least one identifier associated with the at least one IoT server 50, with each sub-group belonging to the same IoT server 50. As an example, IoT devices 40(1)-40(3) belong to IoT server 50(1) and IoT devices 40(4)-40(n) belong to IoT server 50(2).

The processor 34 then determines at Block 116 the number of IoT devices 40 operating within each of the sub-groups based on the client IDs associated with the respective IoT devices 40, with all packets containing the same client ID belonging to a single IoT device. Once the number of IoT devices 40 operating within the network 20 has been determined, the IoT topology is defined at Block 118.

Figure 6:
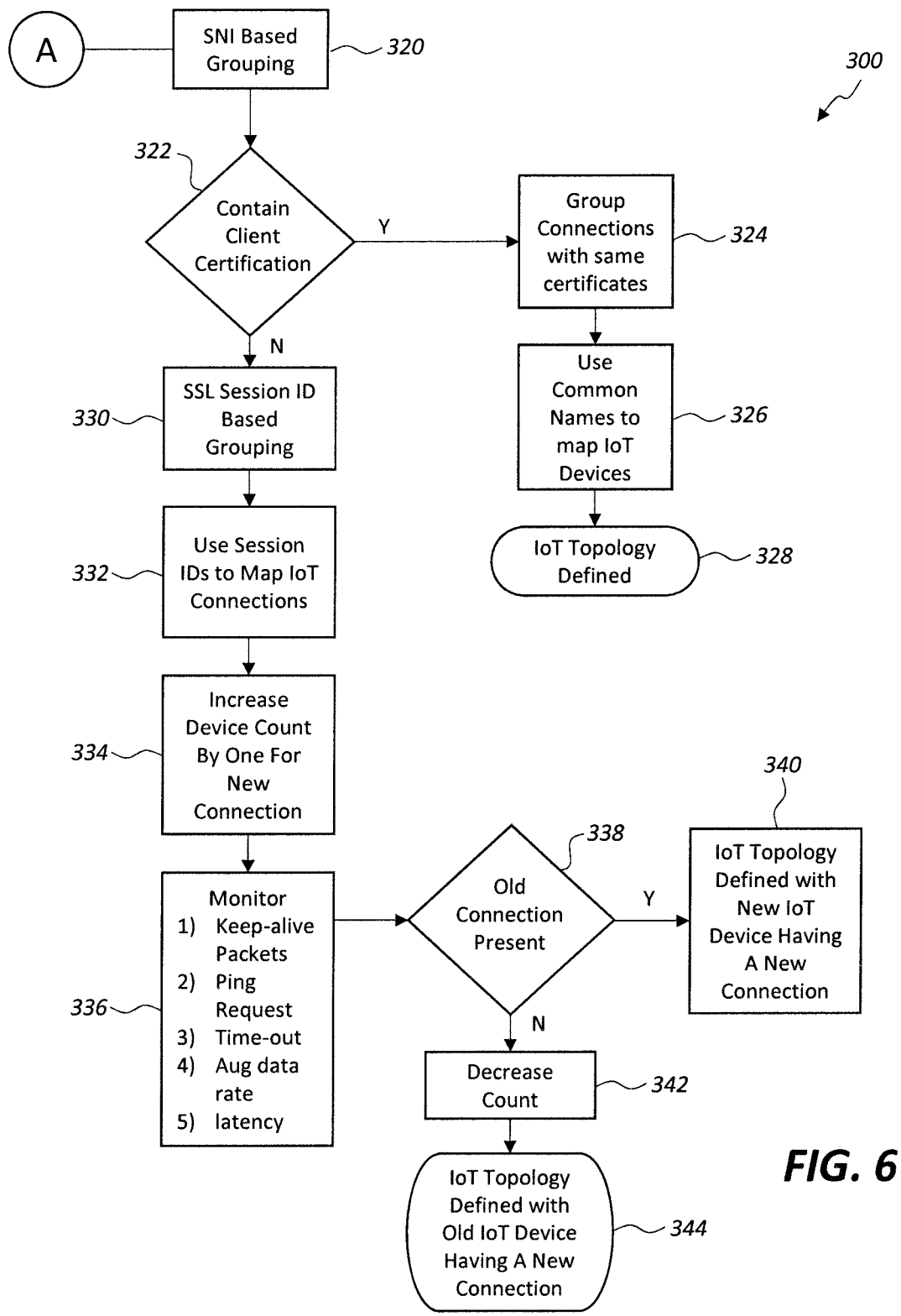

Referring now to FIG. 6, if the processor 34 determined that the packets are encrypted at Block 110, then the packets will include at least one IoT server name indication (SNI) associated with the at least one IoT server 50. More particularly, the SNI is derived from the SSL client hello packet. Each SNI can be mapped to preconfigured sets of IoT brokers/servers to identify that this is an IoT connection. The processor 34 is configured to identify the at least one IoT server 50 based on the at least one SNI at Block 120.

After the SNI for each respective server 50 has been identified, then the processor 34 is configured to determine if the packets include client certificates at Block 122. Client certificates may be used to uniquely identify IoT devices 40. From the common name of the certificate an IoT device 40 can be uniquely identified. Each client certificate thus includes a common name for a corresponding IoT device 40. The processor 34 is configured to group connections with the same certificates at Block 124, and to determine the number of IoT devices 40 operating within the network 20 based on the common names at Block 126. All packets containing the same common name belong to a single IoT device 40. Once the number of IoT devices 40 operating within the network 20 has been determined, the IoT topology is defined at Block 128.

If a connection is encrypted, and if it does not contain a client certificate, then the processor 34 makes use of the SSL session ID and the traffic properties (e.g. packet size, bytes rate, latency and chattiness) to gain insight on the IoT devices 40 operating within the network 20. The same SSL session ID is used in all connections belong to an IoT device 40 until session timeout.

Still referring to the flowchart 100 in FIG. 6, if at Block 122 the processor 34 determines that the packets do not contain client certificates, then for each connection between an IoT device 40 and the at least one IoT server 50 the exchanged packets include a SSL session ID for a corresponding IoT device 40. The processor 34 is configured to perform SSL session ID based grouping at Block 130, and determine the number of IoT devices 40 operating within the network 20 based on the session IDs at Block 132. All connections containing the same session ID belonging to a single IoT device 40.

The processor 34 is further configured to determine if a new session ID for an IoT device 40 is detected. If a new session ID is detected, then the processor 34 increases the determined number of IoT devices 40 operating within the network 20 by one at Block 134.

When a connection with new session ID is found, there are two possible cases. Case 1 is when an old IoT device 40 initiates a connection with a new session ID. Case 2 is when a new IoT device 40 initiates the connection. On receiving a connection with new session ID, the connection will initially be marked as if initiated by a new IoT device 40. For example, IoT topology analyzer 30 has determined that there are currently 100 IoT devices. The new set of connections will now be increased to 101.

The processor 34 is further configured at Block 136 to detect a packet response from the at least one IoT server 50 to an IoT device 40 having an old session ID not in use, and identify a source port in the packet response so as to monitor a response from the IoT device 40 receiving the packet response. The packet response may be based on the protocol associated with the IoT device 40 having the session ID no longer in use. If the protocol is MQTT, for example, then the packet response may be a ping request. If the protocol is HTTP, for example, then the packet response may be a keep-alive packet.

Identification of keep-alive/ping packets may be based on size of the packet, which could be protocol specific, and periodicity of the keep-alive packet sent by the server/broker. The processor 34 identifies such a packet, and by using the source port in the packet, the connection is monitored for keep-alive/ping. For the approximate size of the packet and duration it is sent, this packet can be identified as keep-alive/ping. If device_1 responds, it implies that the old device is active and the new set of connections is initiated by device_2. This means there are 101 devices in the network. If device_1 does not respond it means there at only 100 devices in the network.

Still referring to the flowchart 100 in FIG. 6, based on the monitoring, if the IoT device 40 having the old session ID responds to the packet response at Block 138, then the processor 34 is configured to keep the number of IoT devices 40 increased by one since the IoT device 40 responding to the packet request is an existing IoT device within the network and the IoT device 40 having the new session ID is a new IoT device 40 within the network. The IoT topology is defined at Block 140 with the count determined at Block 126 being increased by one.

If the IoT device 40 having the old session ID does not respond to the packet response at Block 138, then the processor 34 is configured to reduce the number of IoT devices 40 by one at Block 142 since the IoT device 40 having the old session ID has been dropped from the network 20. The IoT topology is defined at Block 144 with the count decreased by one to reflect the old IoT device 40 having a new connection.

As an alternative to the processor 34 monitoring for a packet response (e.g., a ping request or a keep-alive packet) the processor 34 may be configured to determine connection characteristics of exchanged packets for the IoT device 40 having the new session ID, and determine connection characteristics of stored exchanged packets for an IoT device 40 having an old session ID not in use.

To improve the confidence of above process, traffic properties may also be compared by the processor 34. Traffic properties are observed for all the connections initiated by the IoT devices 40. Two IoT devices 40 could have different packet-sizes if one is sending more data than the other. The sent-bytes rate could vary, for example, a room thermometer may send data every 1 minute, but a heart rate monitor may send data every 1 second. But in case of similar devices, e.g., 2 thermometers, both the above properties would be same. Based on the location of two devices, the latency difference would then be used to differentiate the connections.

The IoT topology analyzer 30 includes a memory 38 coupled to the processor 34 for temporarily storing connections of each IoT device 40 operating within the network 20 in real time. The timeframe of each connection being stored may be about 10 minutes, for example. This time value is an example only, and may be increased or decreased based on the number of IoT devices 40 operating within the network 20. The memory storage 38 for each connection is a running memory storage in that as current time is being recorded, older recorded time is being deleted. This is continuously performed so that the overall connection time being recorded is consistent.

The processor 34 is configured to compare the connection characteristics between the IoT device 40 having the new session ID to the IoT device 40 having the old session ID to determine if the IoT device 40 having the old session ID is the same as the IoT device 40 having the new session ID. The connection characteristics may be based on time-out, average data rate, and latency, for example.

Yet another aspect is directed to a non-transitory computer readable medium for operating an IoT topology analyzer 30 comprising an input 32 and a processor 34 coupled to the input 32, and with the non-transitory computer readable medium having a plurality of computer executable instructions for causing the IoT topology analyzer 30 to passively receive packets at the input, with the packets being exchanged between IoT devices 40 operating within a network 20 and at least one IoT server 50 connected to the network 20; and operate the processor 34 to determine a number of IoT devices 40 operating within the network 20 based on the received packets, with the number of IoT devices 40 used to define an IoT topology of the network 20.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. An Internet of Things (IoT) topology analyzer comprising:
   an input configured to passively receive packets exchanged between a plurality of IoT devices operating within a network and at least one IoT server connected to the network; and
   a processor coupled to said input and configured to determine a number of IoT devices operating within the network based on the passively received packets, with the determined number of IoT devices including authorized and potentially unauthorized IoT devices used to define an IoT topology of the network without requesting packets; and
   an output coupled to said processor to provide the defined IoT topology used to identify the potentially unauthorized IoT devices while allowing the potentially unauthorized IoT devices to continue operating within the network.

2. The IoT topology analyzer according to claim 1 wherein the packets transmitted by the plurality of IoT devices include a plurality of IP addresses associated with the plurality of IoT devices, and wherein said processor is configured to determine the number of IoT devices operating within the network based on the number of IP addresses detected within the received packets, with all packets containing a same IP address belonging to a single IoT device.

3. The IoT topology analyzer according to claim 1 wherein the packets transmitted by the plurality of IoT devices are unencrypted, and include a plurality of client identifiers (IDs) associated with the plurality of IoT devices and at least one identifier associated with the at least one IoT server, and wherein said processor is configured to perform the following based on the received packets:
   group together the plurality of IoT devices based on their respective protocols, with each group belonging to the same protocol;
   for each group of IoT devices belonging to the same protocol, divide into sub-groups based the at least one identifier associated with the at least one IoT server, with each sub-group belonging to the same IoT server; and
   determine the number of IoT devices operating within each of the sub-groups based on the client IDs, with all packets containing the same client ID belonging to a single IoT device.

4. The IoT topology analyzer according to claim 3 wherein the at least one identifier associated with the at least one IoT server comprises at least one server ID.

5. The IoT topology analyzer according to claim 3 wherein the at least one identifier associated with the at least one IoT server comprises at least one server web address.

6. The IoT topology analyzer according to claim 3 wherein the network further includes a network address translator (NAT) to exchange the packets between the plurality of IoT devices and the at least one IoT server, and wherein the packets received by said input pass through the NAT.

7. The IoT topology analyzer according to claim 1 wherein the packets transmitted by the plurality of IoT devices are encrypted, and include at least one IoT server name indication (SNI) associated with the at least one IoT server, and wherein said processor is configured to perform the following based on the received packets:
   identify the at least on IoT server based on the at least one SNL.

8. The IoT topology analyzer according to claim 7 wherein the packets transmitted by the plurality of IoT devices include a plurality of client certificates, with each client certificate including a common name for a corresponding IoT device, and wherein said processor is configured to perform the following based on the received packets:
   determine the number of IoT devices operating within the network based on the common names, with all packets containing the same common name belonging to a single IoT device.

9. The IoT topology analyzer according to claim 7 wherein the packets transmitted by the plurality of IoT devices do not include client certificates, and for each connection between an IoT device and the at least one IoT server the exchanged packets include a session ID for a corresponding IoT device, and wherein said processor is configured to perform the following based on the received packets:
   determine the number of IoT devices operating within the network based on the session IDs, with all connections containing the same session ID belonging to a single IoT device.

10. The IoT topology analyzer according to claim 9 wherein said processor is further configured to perform the following when a new session ID for an IoT device is detected:
    increase the determined number of IoT devices operating within the network by one;
    detect a packet response from the at least one IoT server to an IoT device having an old session ID not in use; and
    identify a source port in the packet response so as to monitor a response from the IoT device receiving the packet response, and based on the monitoring, the following is determined:
       if the IoT device having the old session ID responds to the packet response, then keep the number of IoT devices increased by one since the IoT device responding to the packet request is an existing IoT device within the network and the IoT device having the new session ID is a new IoT device within the network, and if the IoT device having the old session ID does not respond to the packet response, then reduce the number of IoT devices by one since the IoT device having the old session ID has been dropped from the network.

11. The IoT topology analyzer according to claim 10 wherein the packet response includes at least one of a keep-alive packet and a ping request based on a protocol associated with the IoT device having the session ID no longer in use.

12. The IoT topology analyzer according to claim 9 wherein said processor is further configured to perform the following when a new session ID for an IoT device is detected:

increase the determined number of IoT devices operating within the network by one;

determine connection characteristics of exchanged packets for the IoT device having the new session ID;

determine connection characteristics of stored exchanged packets for an IoT device having an old session ID not in use; and compare the connection characteristics between the IoT device having the new session ID to the IoT device having the old session ID to determine if the IoT device having the old session ID is the same as the IoT device having the new session ID.

13. The IoT topology analyzer according to claim 12 wherein the connection characteristics are based on at least one of the following: time-out, average data rate, and latency.

14. A method for operating an Internet of Things (IoT) topology analyzer comprising an input and an output with a processor coupled therebetween, the method comprising:

passively receiving packets at the input, with the packets being exchanged between a plurality of IoT devices operating within a network and at least one IoT server connected to the network; and operating the processor to determine a number of IoT devices operating within the network based on the passively received packets, with the determined number of IoT devices including authorized and potentially unauthorized IoT devices used to define an IoT topology of the network without requesting packets; and providing the defined IoT topology used to identify the potentially unauthorized IoT devices while allowing the potentially unauthorized IoT devices to continue operating within the network.

15. The method according to claim 14 wherein the packets transmitted by the plurality of IoT devices include a plurality of IP addresses associated with the plurality of IoT devices, and wherein the processor is configured to determine the number of IoT devices operating within the network based on the number of IP addresses detected within the received packets, with all packets containing a same IP address belonging to a single IoT device.

16. The method according to claim 14 wherein the packets transmitted by the plurality of IoT devices are unencrypted, and include a plurality of client identifiers (IDs) associated with the plurality of IoT devices and at least one identifier associated with the at least one IoT server, and wherein the processor is configured to perform the following based on the received packets:

group together the plurality of IoT devices based on their respective protocols, with each group belonging to the same protocol;

for each group of IoT devices belonging to the same protocol, divide into sub-groups based the at least one identifier associated with the at least one IoT server, with each sub-group belonging to the same IoT server; and determine the number of IoT devices operating within each of the sub-groups based on the client IDs, with all packets containing the same client ID belonging to a single IoT device.

17. The method according to claim 14 wherein the packets transmitted by the plurality of IoT devices are encrypted, and include at least one IoT server name indication (SNI) associated with the at least one IoT server, and wherein the processor is configured to perform the following based on the received packets:

identify the at least on IoT server based on the at least one SNL.

18. The method according to claim 17 wherein the packets transmitted by the plurality of IoT devices include a plurality of client certificates, with each client certificate including a common name for a corresponding IoT device, and wherein the processor is configured to perform the following based on the received packets:

determine the number of IoT devices operating within the network based on the common names, with all packets containing the same common name belonging to a single IoT device.

19. The method according to claim 17 wherein the packets transmitted by the plurality of IoT devices do not include client certificates, and for each connection between an IoT device and the at least one IoT server the exchanged packets include a session ID for a corresponding IoT device, and wherein the processor is configured to perform the following based on the received packets:

determine the number of IoT devices operating within the network based on the session IDs, with all connections containing the same session ID belonging to a single IoT device.

20. A non-transitory computer readable medium for operating an Internet of Things (IoT) topology analyzer comprising an input and an output with a processor coupled therebetween, and with the non-transitory computer readable medium having a plurality of computer executable instructions for causing the IoT topology analyzer to perform steps comprising:

passively receive packets at the input, with the packets being exchanged between a plurality of IoT devices operating within a network and at least one IoT server connected to the network; and operate the processor to determine a number of IoT devices operating within the network based on the passively received packets, with the determined number of IoT devices including authorized and potentially unauthorized IoT devices being used to define an IoT topology of the network without requesting packets; and provide the defined IoT topology used to identify the potentially unauthorized IoT devices while allowing the potentially unauthorized IoT devices to continue operating within the network.

21. The non-transitory computer readable medium according to claim 20 wherein the packets transmitted by the plurality of IoT devices include a plurality of IP addresses associated with the plurality of IoT devices, and wherein the processor is configured to determine the number of IoT devices operating within the network based on the number of IP addresses detected within the received packets, with all packets containing a same IP address belonging to a single IoT device.

22. The non-transitory computer readable medium according to claim 20 wherein the packets transmitted by the plurality of IoT devices are unencrypted, and include a plurality of client identifiers (IDs) associated with the plurality of IoT devices and at least one identifier associated with the at least one IoT server, and wherein the processor is configured to perform the following based on the received packets:
   group together the plurality of IoT devices based on their respective protocols, with each group belonging to the same protocol;
   for each group of IoT devices belonging to the same protocol, divide into sub-groups based the at least one identifier associated with the at least one IoT server, with each sub-group belonging to the same IoT server; and
   determine the number of IoT devices operating within each of the sub-groups based on the client IDs, with all packets containing the same client ID belonging to a single IoT device.

23. The non-transitory computer readable medium according to claim 20 wherein the packets transmitted by the plurality of IoT devices are encrypted, and include at least one IoT server name indication (SNI) associated with the at least one IoT server, and wherein the processor is configured to perform the following based on the received packets:
   identify the at least on IoT server based on the at least one SNL.

24. The non-transitory computer readable medium according to claim 23 wherein the packets transmitted by the plurality of IoT devices include a plurality of client certificates, with each client certificate including a common name for a corresponding IoT device, and wherein the processor is configured to perform the following based on the received packets:
   determine the number of IoT devices operating within the network based on the common names, with all packets containing the same common name belonging to a single IoT device.

25. The non-transitory computer readable medium according to claim 23 wherein the packets transmitted by the plurality of IoT devices do not include client certificates, and for each connection between an IoT device and the at least one IoT server the exchanged packets include a session ID for a corresponding IoT device, and wherein the processor is configured to perform the following based on the received packets:
   determine the number of IoT devices operating within the network based on the session IDs, with all connections containing the same session ID belonging to a single IoT device.

* * * * *